United States Patent [19]

Rodaway

[11] 4,370,790

[45] Feb. 1, 1983

[54] T-JOINT METHOD AND PRODUCT

[75] Inventor: Keith S. Rodaway, Santa Monica, Calif.

[73] Assignee: Everest & Jennings, Inc., Camarillo, Calif.

[21] Appl. No.: 218,218

[22] Filed: Dec. 19, 1980

[51] Int. Cl.³ .............................................. B21D 53/00
[52] U.S. Cl. ................................. 29/157 T; 403/205; 256/65; 285/156
[58] Field of Search ................ 403/205, 403; 285/156; 29/157 T; 228/161; 256/65

[56] References Cited

U.S. PATENT DOCUMENTS

| | | | |
|---|---|---|---|
| 2,157,274 | 5/1939 | Williams | 285/156 |
| 2,470,499 | 5/1949 | Lapp | 285/156 X |
| 3,040,427 | 6/1962 | Howell | 228/161 X |
| 3,502,357 | 3/1970 | Wagner | 29/157 T |

FOREIGN PATENT DOCUMENTS 347050  7/1960  Switzerland ........................ 285/156

Primary Examiner—Andrew V. Kundrat
Attorney, Agent, or Firm—Ralph B. Pastoriza

[57] ABSTRACT

The cross-piece portion of a tubular T-joint has a cross-section of constant inside diameter from one end of the cross-piece to the other and increasing outside diameter from one end towards it center, then decreasing from its center towards it opposite end to define a double tapered tube wall for the cross-piece of maximum thickness at its center. A stem portion for the T-joint is in the form of a hollow tube extending normally away from the center portion of the cross-piece to terminate in a free end. The cross-section of the stem has a constant inside diameter from its free end to its point of interception with the cross-piece and an outside diameter increasing from its free end to its point-of-interception with the cross-piece so that the maximum thickness of the T-joint is at the interception between the cross-piece and the stem and yet the inside diameters are all uniform so that other tubes can be readily telescoped through the cross-piece.

2 Claims, 7 Drawing Figures

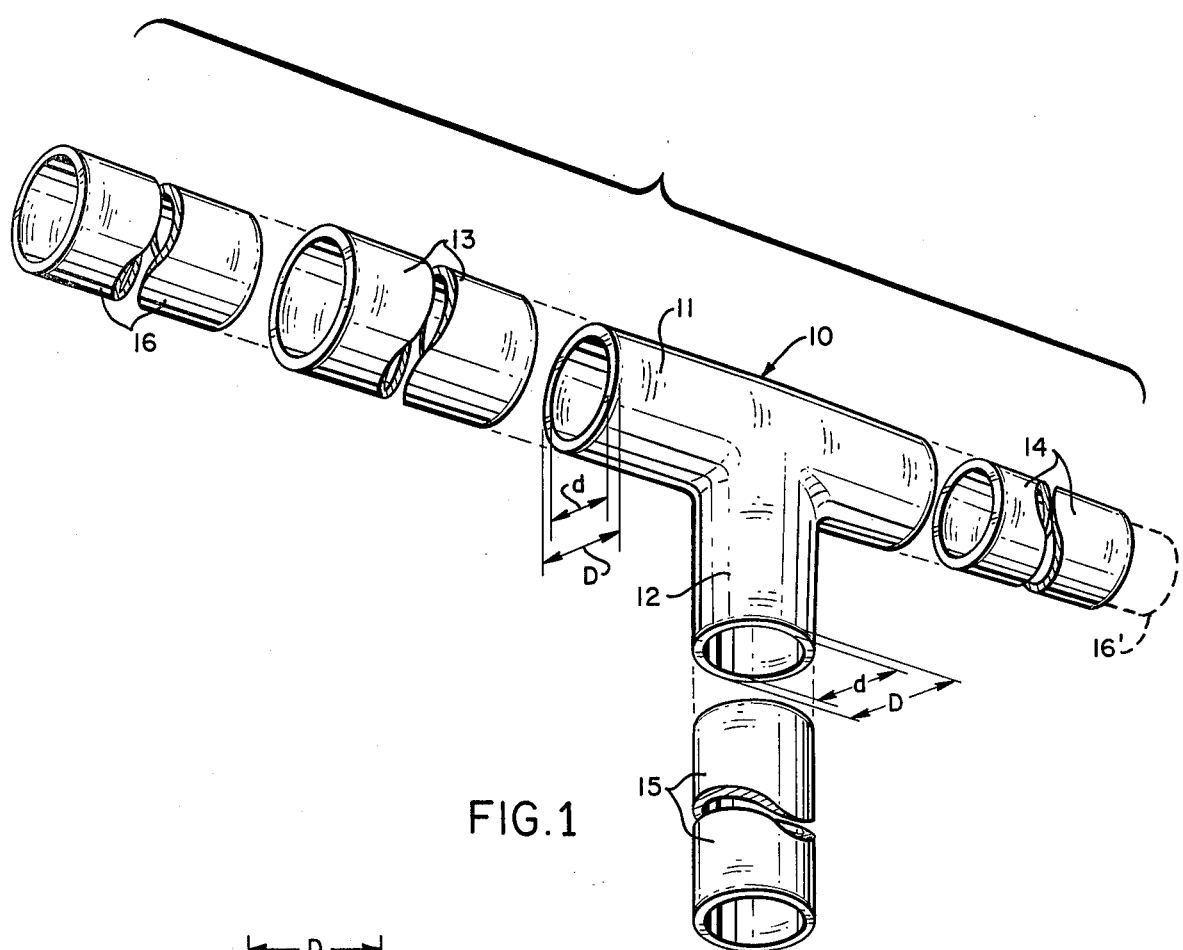
FIG.1
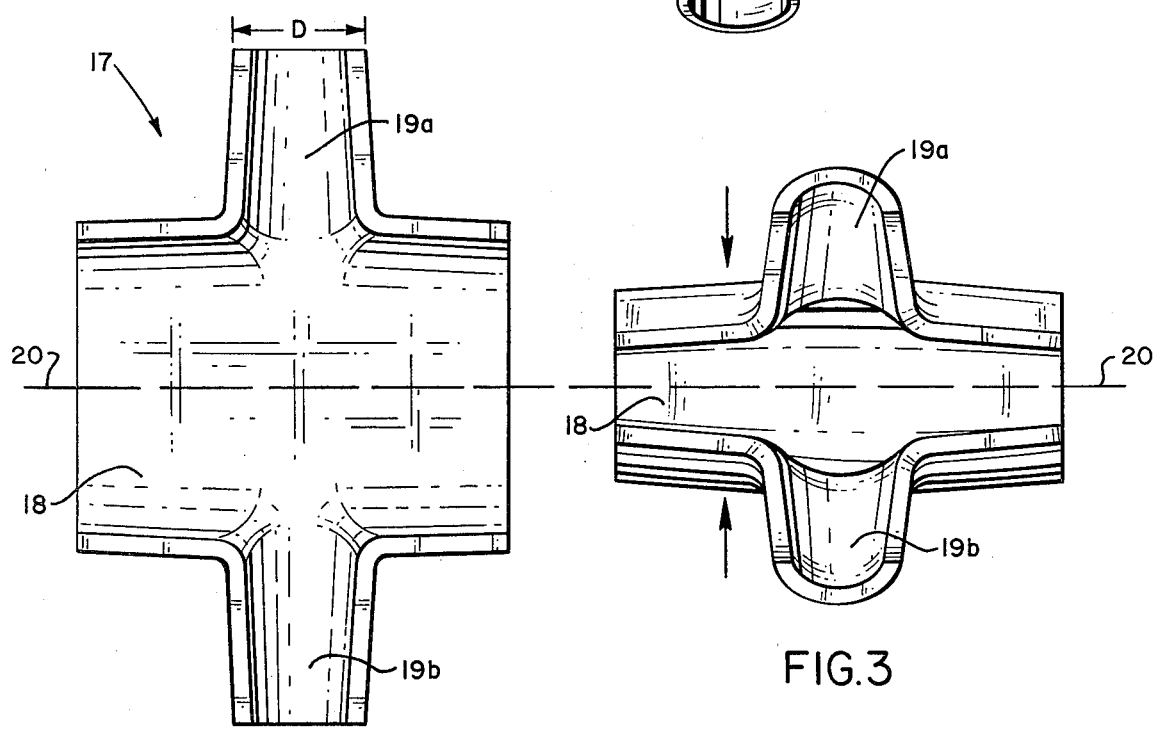
FIG.2
FIG.3

T-JOINT METHOD AND PRODUCT

This invention relates generally to T-joints and more particularly to an improved T-joint and method of making the same for use in wheelchair frames, wherein the T-joint is subject to varying loads in a continuous manner when the wheelchair is in use.

BACKGROUND OF THE INVENTION

In the construction of wheelchair frames, there are many interception points of tubes wherein a T-joint is required. Normally, T-joints are made by simply welding one end of a tube to a mid-portion of another tube to thereby define a stem and cross-portion. The problem is that the weakest point in the T-joint is the interception point between the stem and cross-piece where the weld takes place and this portion will normally fail before any other parts of the frame.

In an effort to solve the foregoing problem, T-joints have been made in such a manner as to provide in essence an integrally formed connection between the stem and cross-piece of the joint. For example, by providing a cruciform-shaped stamping having a main cross-piece portion with opposite edges from which laterally extend semi-cylindrical portions, the opposite edges of the main cross-piece portion can be brought together by rolling the cross-piece portion into a cylindrical shape, this motion automatically bringing the oppositely extending semi-cylindrical portions together to form a stem. The opposed edges brought together can then be welded, the weld line following a lateral line on the cross-piece and stem. Further pipe sections can then be welded to the opposite ends of the cross-piece and the free end of the stem to form a desired T-shaped frame.

T-joints made in the foregoing manner are stronger than the heretofore referred to type T-joints where the stem is simply welded to the central portion of the cross-piece. However, under prolonged strain, the T-joint can still fail at the interception point where the stresses and strains are concentrated.

BRIEF DESCRIPTION OF THE PRESENT INVENTION

With the foregoing considerations in mind, the present invention contemplates the provision of an improved T-joint and method of making the same wherein the joint itself experiences substantially longer life than presently available T-joints.

In accord with the present invention, the T-joint itself is formed in the same manner as the above referred-to type T-joints made from cruciform stamping. However, the opposite edges of the cross-piece portion of the stamping initially diverge from each other from each end towards the center. The oppositely extending semi-cylindrical stem portions, in turn, have their opposite edges diverging from each other from the free ends towards the cross-piece portion. Rolling the cross-piece portion into a cylindrical shape by bringing its said opposite edges together will form the cross-piece, the semi-cylindrical portions thereby being brought together to form the stem. The opposed edges of the cross-piece and stem can then be welded as before.

After the foregoing steps have been carried out, the cross-piece is drilled by a drill of diameter corresponding to the central inside diameter of the cross-piece to thereby remove material as the drill enters one end and exits through the opposite end on either side of the center of the cross-piece to provide tapered walls with a uniform inside diameter for the cross-piece. Similarly, the free end of the stem is drilled with the same drill to remove material at the entrance portion of the stem so that the wall thickness of the resulting T-joint is greater at the interception of the cross-piece and stem than at the opposite ends of the cross-piece and entrance end of the stem, thereby providing greater strength.

Pipe sections themselves can then be welded to the ends of the T-joint and because the inside diameter is uniform in both the cross-piece and stem, additional telescoping pipe sections can pass through the welded-on sections and T-joint in the same manner as with prior art type T-joints.

BRIEF DESCRIPTION OF THE DRAWINGS

A better understanding of this invention as well as further features and advantages thereof will be had by now referring to the accompanying drawings in which:

FIG. 1 is an exploded perspective view of a T-joint of the present invention preparatory to having further pipe sections welded thereto;

FIG. 2 is a plan view of a cruciform-shaped stamping employed in forming the T-joint of FIG. 1;

FIG. 3 is a view similar to FIG. 2 but showing how the stamping can be formed into the T-joint of FIG. 1, the stamping being shown in partially formed condition;

DETAILED DESCRIPTION OF THE PREFERRED EMBODIMENT

Figure 4:
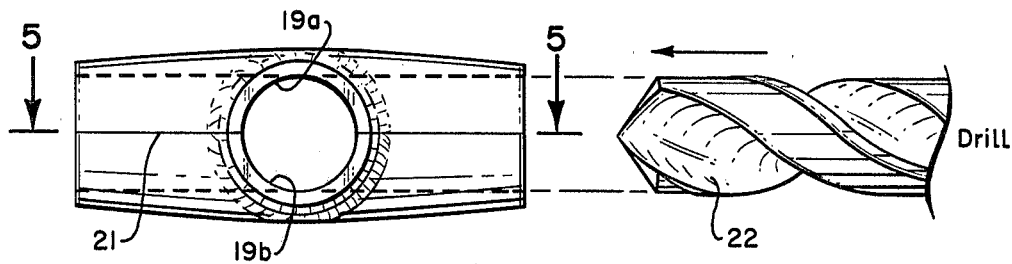
FIG. 4 is a plan view of the stamping of FIGS. 2 and 3 after the same has been completely formed into a T-joint and welding has been effected to hold the opposed edges together and wherein there is illustrated to the right a drill for performing a final step in accord with the method.

Referring first to FIG. 1, there is designated generally by the numeral 10 a T-joint comprising a cross-piece 11 in the form of a hollow tube having a circular cross-section of constant inside diameter d from one end of the cross-piece to the other. The outside diameter at the open end of the cross-piece 11 is indicated at D and increases from this end towards the center and thence decreases from the center towards the opposite end to define a double tapered tube wall for the cross-piece of maximum thickness at its center.

The stem portion 12, in turn, is in the form of a hollow tube extending normally away from the center portion of the cross-piece to terminate in a free end, the cross-section of the stem having a constant inside diameter d corresponding to the same inside diameter d of the cross-piece 11. The outside diameter at the free end of the stem 12 is D and increases from this free end to the point where it intercepts the cross-piece 11 to define a tapered tube wall with maximum thickness at the point where it intercepts the cross-piece. As a consequence, the interception point of the cross-piece 11 with the stem 12 has a greater thickness than the remaining portion thereof to provide an increased strength at the interception point.

Appropriate further pipe sections such as indicated at 13 and 14 can now be welded to the opposite ends of the cross-piece 11 of the T-joint and a pipe section 15 can be welded to the free end of the stem portion 12. The inside diameters of these pipe sections correspond to the inside diameter d of the cross-piece and stem. Further, the outside diameters of the pipe sections correspond to the outside diameter D at the opposite open ends of the cross-piece and free end of the stem. As a consequence, when these pipe sections are welded to the T-joint 10, there is a smooth outer surface and a constant inside diameter bore through both the pipe sections and stem so that a telescoping tube such as indicated to the upper left of FIG. 1 at 16 can pass all the way through the pipe sections 13 and 14 and the cross-piece 11. Such complete freedom of movement for a telescoping tube through the T-joint of this invention is indicated by the extension of the tube 16 through all of the members as indicated by the phantom line 16' to the right of the pipe section 14 in FIG. 1.

Referring now to FIGS. 2 and 3, certain steps in accord with the method of this invention in forming an improved T-joint will be described.

Considering first FIG. 2, there is shown a cruciform shaped stamping designated generally by the numeral 17. This stamping is formed into a main cross-piece portion 18 having opposite edges diverging from each other from each end towards the center and having semi-cylindrical stem portions 19a and 19b extending in opposite directions from the central portion of the referred-to opposite edges. Each of the stem portions 19a and 19b in turn has its opposite edges diverging from its free ends towards the cross-piece portion 18. The initial thickness of the stamping 17 which is uniform throughout is made greater than the normal thickness of pipe sections utilized in a wheelchair construction or other construction where the T-joint of this invention might be used.

If now the main cross-piece portion 18 is rolled into a cylindrical shape as about a horizontal axis 20 as viewed in FIG. 2, the semi-cylindrical portions 19a and 19b will be brought together as the opposite edges of the cross-piece portion 18 are brought together.

FIG. 3 shows an intermediate position of the cross-piece portion 18 and the bringing together of the semi-cylindrical stem portions 19a and 19b.

Referring to FIG. 4, there is shown the appearance of the stamping after the rolling operation about the axis 20 has been completed so that the opposed edges are in full contact with each other. At this point, a weld is made along the opposed edges as indicated at 21 in FIG. 4.

Shown to the right of FIG. 4 is a drill 22 having an outside diameter which corresponds with the inside diameter of pipe sections to be connected to the T-joint and which also corresponds with the inside diameter of the cross-piece of the T-joint itself at its center. As will become clearer with reference to FIGS. 5 and 6 as the drill 22 is passed through the cross-piece, it will mill out a uniform inside diameter of diameter d leaving tapered wall portions.

Figure 5:
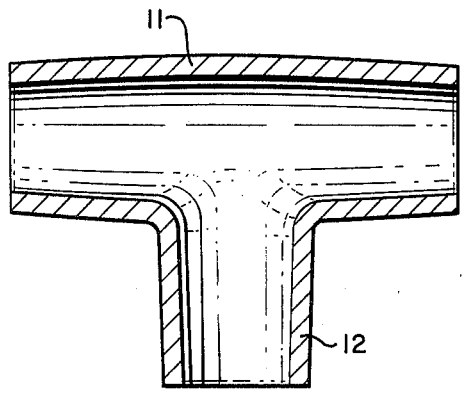
FIG. 5 is a cross-section of the T-joint of FIG. 4 prior to the drilling step looking in the direction of the arrows 5—5.

Considering the view of FIG. 5 prior to the step of drilling, it will be noted that the cross-piece 11 and stem portion 12 have walls of uniform thickness resulting in an increasing inside and outside diameter from the opposite ends of the cross-piece 11 towards the center and from the free end of the stem 12 towards its point of interception.

Figure 6:
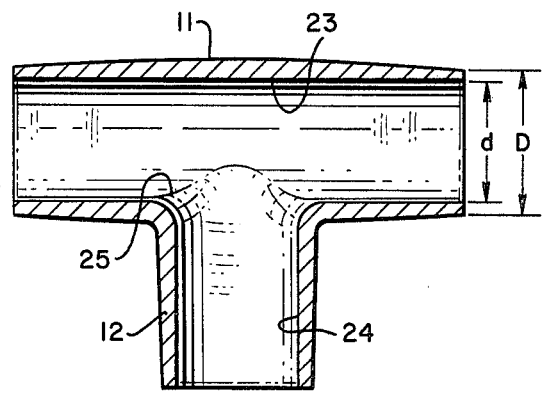
FIG. 6 is a cross-section similar to FIG. 5 but illustrating the T-joint after the drilling step; and, FIG. 7 is an enlarged cross section of one end of the cross-piece of the T-joint showing how the same is welded to a pipe section.

It can now be appreciated that when the drill 22 of FIG. 4 is passed through the cross-piece and into the free end of the stem, material will be removed as the drill enters one end and exits through the opposite end on either side of the center of the cross-piece. The result is the provision of tapered walls with a uniform inside diameter for the cross-piece, the tapered walls corresponding to those described in FIG. 1 for the T-joint 10. In FIG. 6, the uniform inside diameter bore resulting from the drilling is indicated at 23 in the cross-piece 11 and the inside and outside diameters d and D are shown, the outside diameter D increasing towards the center of the cross-piece 11.

Similarly, when the same drill 22 is passed into the free end of the stem 12, material is removed at the entrance end to provide a uniform inside diameter bore 24. Again, there thus results a tapered wall which increases in diameter from the free end towards the interception point for the cross-piece 11.

The result of the drilling step is that there is provided a greater wall thickness at the interception point of the cross-piece and stem as at 25 in FIG. 6 than at the opposite ends of the cross-piece and free end of the stem. Since the interception point is where most stress occurs when the T-joint is placed under various force components, the increased wall thickness at this point will greatly increase the overall life of the T-joint.

Figure 7:
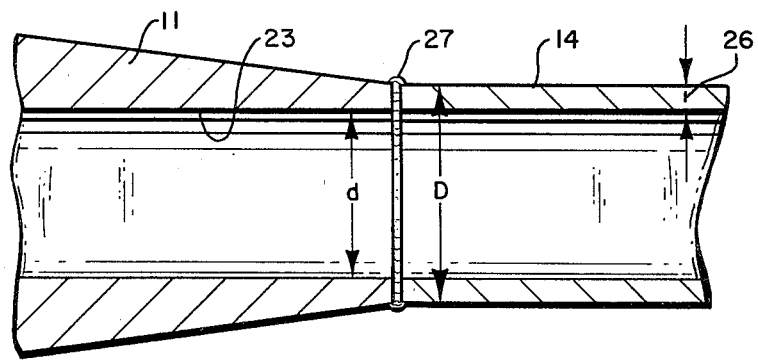

Referring now to FIG. 7, there is shown, by way of example, a typical pipe section 14 welded to the right-hand end of the cross piece 11 shown in FIG. 6. It will be noted that this pipe section 14 has an outside diameter D and an inside diameter d corresponding respectively to the outside diameter of the end opening of the cross-piece 11 and the uniform inside diameter d of the cross-piece. As a consequence, there is a smooth transition of the outside diameter of the pipe section 14 to the increasing diameter of the cross-piece 11 and the inside diameter of the pipe section 14 is in exact alignment and correspondence with the inside diameter of the bore 23 formed in the cross-piece. An appropriate weld is indicated at 27 to secure the pipe section 14 to the cross-piece.

Because of the smooth transition, there are no abrupt discontinuities in the various connections and an overall T configuration, made up of pipe sections between which there is provided the T-joint will last considerably longer than when prior art type T-joints are used.

Finally, and as mentioned heretofore, it will be appreciated that because the tapered walls are provided by an increasing outside diameter and because a uniform constant inside diameter is maintained, telescoping tubes can readily be used with the T-joint of this invention as in prior art T-joints. This feature is important particularly in the case of wheelchairs wherein telescoping tubes pass through the cross-piece portions of T-joints in many types of constructions.

From all of the foregoing, it can now be appreciated that the present invention has provided a greatly improved T-joint and method of making the same.

I claim:

1. A method of making a tubular T-joint, including the steps of:
(a) forming a cruciform-shaped stamping into a main cross-piece portion having opposite edges diverging from each other from each end towards the center and having semi-cylindrical stem portions extending in opposite directions from the central portion of said main cross-piece portion, each of said stem portions having their opposite edges diverging from their free ends towards the cross-piece portion;

(b) rolling the cross-piece portion into a cylindrical shape by bringing its said opposite edges together to form a cross-piece, the semi-cylindrical portions thereby being brought together to form a stem;

(c) welding the opposite edges of the cross-piece and the opposing edges of the semi-cylindrical stem portions together to form a T-joint;

(d) drilling through the cross-piece with a drill of diameter corresponding to the central inside diameter of the cross-piece to thereby remove material as the drill enters one end and exits through the opposite end on either side of the central portion of the cross-piece to provide tapered walls with a uniform inside diameter for the cross-piece; and (e) drilling into said stem with the same diameter drill used for said cross-piece to remove material at the entrance portion of the stem whereby the wall thickness of the resulting T-joint is greater at the intersection of the cross-piece and the stem than at the opposite ends of the cross-piece and entrance ends of the stem.

2. The method of claim 1, including the steps of welding tube sections onto the opposite ends of the cross-piece and free end of the stem to provide a desired T-joint between the tube sections, the inside diameter of the tube sections corresponding to the diameter of said drill and the outside diameter corresponding to the outside diameters at the entrance ends of the cross-piece and stem so that a smooth and continuous outer surface is provided between the pipe sections and T-joint, and other tube sections having outside diameters corresponding to the outside diameter of said drill can be telescoped within the pipe sections connecting to the opposite ends of the cross-piece and through the cross-piece.

* * * * *